(12) United States Patent
Baum et al.

(10) Patent No.: US 10,288,456 B2
(45) Date of Patent: *May 14, 2019

(54) FLUID MONITORING APPARATUS

(71) Applicant: Entegris, Inc., Billerica, MA (US)

(72) Inventors: Thomas H. Baum, New Fairfield, CT (US); Ing-Shin Barry Chen, Danbury, CT (US); Richard D. Chism, Round Rock, TX (US)

(73) Assignee: Entegris, Inc., Billerica, MA (US)

( * ) Notice: Subject to any disclaimer, the term of this patent is extended or adjusted under 35 U.S.C. 154(b) by 706 days.

This patent is subject to a terminal disclaimer.

(21) Appl. No.: 14/854,625

(22) Filed: Sep. 15, 2015

(65) Prior Publication Data

US 2016/0003651 A1 Jan. 7, 2016

Related U.S. Application Data

(63) Continuation of application No. 13/381,332, filed as application No. PCT/US2010/039675 on Jun. 23, 2010, now Pat. No. 9,134,146.

(60) Provisional application No. 61/221,962, filed on Jun. 30, 2009.

(51) Int. Cl.
*G01D 11/24* (2006.01)
(52) U.S. Cl.
CPC .................. *G01D 11/245* (2013.01)

(58) Field of Classification Search
USPC .............................................. 73/31.05, 53.01
See application file for complete search history.

(56) References Cited

U.S. PATENT DOCUMENTS

| | | |
|---|---|---|
| 5,363,690 A | 11/1994 | Evangelista et al. |
| 5,495,747 A | 3/1996 | Herman et al. |
| 5,821,405 A | 10/1998 | Dickey et al. |
| 6,428,330 B1 | 8/2002 | Poulter et al. |
| 7,007,541 B2 | 3/2006 | Henry et al. |
| 7,493,799 B1 * | 2/2009 | Discenzo ............... F16C 19/52 184/108 |
| 9,134,146 B2 | 9/2015 | Baum et al. |

* cited by examiner

*Primary Examiner* — Daniel S Larkin
(74) *Attorney, Agent, or Firm* — Entegris, Inc.

(57) ABSTRACT

A fluid monitoring apparatus, including a circuitry housing containing circuitry for processing fluid sensing signals and responsively transmitting an output, with a sensor assembly adapted for mechanical and electrical coupling to the circuitry housing. The sensor assembly includes at least one sensing member arranged to respond to a fluid species of interest in the monitored fluid, for generation of an output. The apparatus includes at least one of (A) a printed circuit board adapted to engage the circuitry housing and to mechanically couple to the sensor assembly, (B) the sensor assembly including a base and sensing element removably connected to the base by press-fit coupling elements, and (C) the sensor assembly including a base and a sensing filament connected thereto, and a filament guard to protectively circumscribe the sensing filament.

18 Claims, 8 Drawing Sheets

FLUID MONITORING APPARATUS

CROSS-REFERENCE TO RELATED APPLICATIONS

This application is a continuation application under 35 USC § 120 of U.S. patent application Ser. No. 13/381,332, filed Dec. 28, 2011 in the names of Thomas H Baum, et al. for "Fluid Monitoring Apparatus" and issued Sep. 15, 2015 as U.S. Pat. No. 9,134,146, which is a U.S. national phase application under the provisions of 35 U.S.C. § 371 of International Patent Application No. PCT/USIO/39675 filed Jun. 23, 2010, which in turn claims the benefit of priority under 35 USC § 119 of U.S. Provisional Patent Application No. 61/221,962 filed Jun. 30, 2009 in the names of Thomas H Baum, et al. for "Fluid Monitoring Apparatus". The disclosures of such U.S. patent application Ser. No. 13/381, 332, International Patent Application No. PCT/USIO/39675, and U.S. Provisional Patent Application No. 61/221,962 are hereby incorporated herein by reference in their respective entireties, for all purposes, and the benefit and priorities of such applications are hereby claimed.

BACKGROUND

Field of the Invention

The present invention relates to a fluid monitoring apparatus of a compact and modular character, including field-replaceable components.

Description of the Related Art

In the manufacture of microelectronic devices, a variety of process tools are employed, having chambers that require cleaning to remove deposited materials from wall surfaces and internal structures of such chambers. Process tools, as such term is used herein, refers to apparatus that is utilized to conduct unit operations in microelectronic device manufacture, such as chemical vapor deposition, physical vapor deposition, etching, ion implantation, etc.

Various nitrides, including silicon nitride, titanium nitride, and tantalum nitride, are used in semiconductor processing as interlayer dielectrics and diffusion barriers. Post-processing deposit removal from the process tool is critical to ensure that deposits do not disengage, e.g., flake away, and contaminate the surface of a wafer during subsequent active processing, since such contamination can render the resulting microelectronic device product deficient or even useless for its intended purpose. Further, the chamber may include specialized components, such as collimators, shields, electrostatic chucks, etc., whose utility can be compromised by such deposits.

Accordingly, a variety of cleaning reagents and cleaning processes have evolved to address the need for removing unwanted deposits from microelectronic manufacturing tools and substrates on which such deposits are present. For example, fluorocompound cleaning compositions are available and may be used in ionized, e.g., plasma, forms to achieve removal of deposits from surfaces in the process tool.

In such cleaning operations, silicon nitride deposits are known to be particularly difficult to remove, in relation to other deposits, such as silicon or silicon oxides. As a result, the conventional approach to cleaning process chambers containing silicon nitride deposits has been to extend the clean time of the chamber, to thereby increase the effectiveness of the cleaning operation.

This approach, however, consumes expensive source gases, and typically does not achieve complete removal. As a result of such incomplete cleaning, system performance is compromised. For example, vapor deposition process tools may use showerhead vapor feed devices in the process chamber, and incomplete cleaning of the chamber and its internal components means that the expensive showerhead must be replaced regularly because nitride deposits are not removed and eventually accumulate to a point that the showerhead openings become plugged, rendering the showerhead useless for delivery of deposition reagents.

To address this problem, various effluent monitoring systems have been employed to determine the end point of the cleaning operation. For example, the endpoint monitor may be arranged to sense specific deposit or contaminant species in the process chamber that are removed by the cleaning operation, so that when such components are no longer sensed in the effluent, the endpoint monitor is effective to output a signal indicative of such endpoint having been reached in the cleaning operation.

The art continues to seek improved end point monitoring systems applicable to process tool cleaning operations.

SUMMARY

The present invention relates to a fluid monitoring apparatus of a type useful in endpoint monitoring applications in semiconductor manufacturing facilities.

In one aspect, the invention relates to a fluid monitoring apparatus, comprising:
a circuitry housing adapted for retention therein of circuitry for processing fluid sensing signals and responsively transmitting an output; and
a sensor assembly adapted for mechanical and electrical coupling to the circuitry housing, including at least one sensing member arranged to contact fluid and respond to presence of a fluid species of interest in the contacted fluid by change of a characteristic of the sensing member that is inputtable to circuitry in the circuitry housing, to generate an output;
wherein the apparatus comprises at least one of the following structural features (A)-(C):
(A) the circuitry comprising a printed circuit board adapted to engage the circuitry housing and to mechanically couple to the sensor assembly;
(B) the sensor assembly including a base and a sensing element removably connected to the base by press-fit coupling elements; and
(C) the sensor assembly including a base and a sensing filament connected thereto, and a filament guard removably coupleable to the base to protectively circumscribe the sensing filament.

Other aspects, features and embodiments of the invention will be more fully apparent from the ensuing disclosure and appended claims.

DETAILED DESCRIPTION

Figure 1:
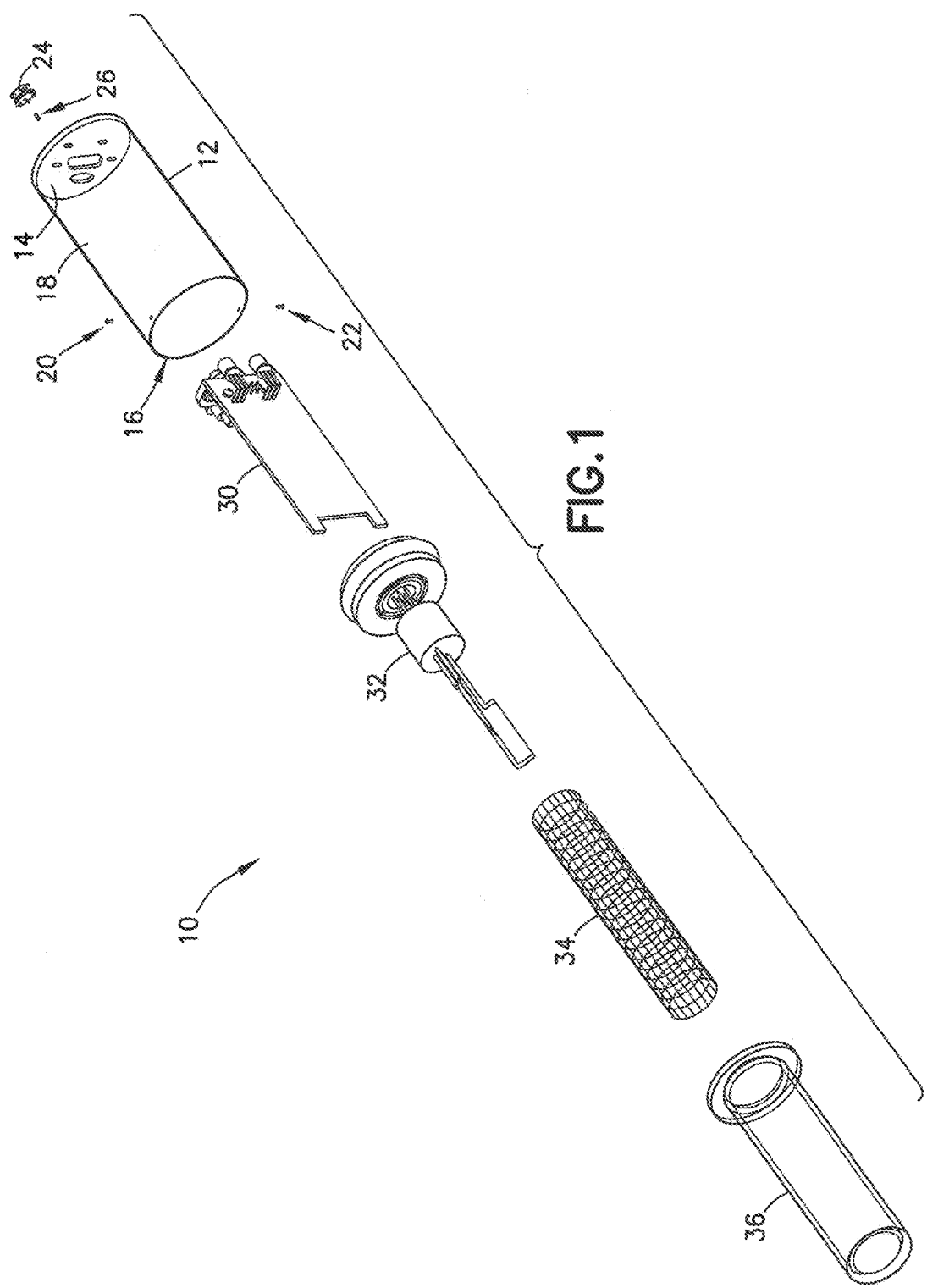
FIG. 1 is a perspective exploded view of a fluid monitoring apparatus according to one embodiment of the invention.

The present invention relates to a fluid monitoring apparatus useful for endpoint monitoring, such as monitoring of process tool cleaning operations in semiconductor manufacturing facilities.

The fluid monitoring apparatus of the invention has a compact and modular character, including field-replaceable components.

The invention in one aspect relates to a fluid monitoring apparatus, comprising:
a circuitry housing adapted for retention therein of circuitry for processing fluid sensing signals and responsively transmitting an output; and
a sensor assembly adapted for mechanical and electrical coupling to the circuitry housing, including at least one sensing member arranged to contact fluid and respond to presence of a fluid species of interest in the contacted fluid by change of a characteristic of the sensing member that is inputtable to circuitry in the circuitry housing, to generate an output;
wherein the apparatus comprises at least one of the following structural features (A)-(C):
(A) the circuitry comprising a printed circuit board adapted to engage the circuitry housing and to mechanically couple to the sensor assembly;
(B) the sensor assembly including a base and a sensing element removably connected to the base by press-fit coupling elements; and
(C) the sensor assembly including a base and a sensing filament connected thereto, and a filament guard removably coupleable to the base to protectively circumscribe the sensing filament.

The invention thus contemplates various structural feature embodiments including:
(A);
(B);
(C);
(A) and (B);
(A) and (C);
(B) and (C); or
(A), (B) and (C).

In one embodiment, the circuitry housing in the fluid monitoring apparatus is of elongate cylindrical shape with a closed proximal end wall, and an open distal end, wherein the closed proximal end wall contains one or more openings therein for self-aligning registration of the circuitry therewith. The circuitry may comprise a printed circuit board and a connector coupled therewith, wherein the connector engages one of the openings in the proximal end wall, and an LED coupled to the printed circuit board, wherein the LED engages another opening in the proximal end wall.

In another embodiment of the fluid monitoring apparatus, the sensor assembly includes a base that engages the open distal end of the circuitry housing, and the printed circuit board includes at least one extension portion engageable with the base.

Generally, the sensing element utilized in the fluid monitoring apparatus can be of any suitable type, including for example a sensing filament of a suitable material, e.g., metal or other material that is interactive with one or more fluid species of interest to produce a change that can be transmitted or processed to output a signal indicative of the presence and/or concentration of the species of interest.

In embodiments of the fluid monitoring apparatus in which a filament guard is employed, the filament guard may be of any suitable shape and construction. For example, the filament guard may be of a cylindrical form, comprising an array of circumferentially extending first strand elements and an array of longitudinally extending second strand elements, wherein the first strand elements and second strand elements are interconnected.

The filament guard may be constructed to comprise a proximal ring having an inverted L-shaped slot therein, wherein the base includes a locking protrusion member, and wherein the filament guard is removably coupled to the base by engagement of the locking protrusion member in a laterally extending portion of the inverted L-shaped slot.

The sensor assembly may include one or more sensor devices or sensing structures or components. In one embodiment, the sensor assembly includes a first sensing member comprising a sensing filament, and a second sensing member comprising a thermocouple. The thermocouple in such arrangement may be arranged to compensate the first sensing member for changes of monitoring conditions, e.g., for changes of fluid monitoring temperature condition. The thermocouple can be of any suitable form, and may in a specific embodiment have a wishbone conformation.

The fluid monitoring apparatus of the invention can be arranged to monitor fluid from a semiconductor manufacturing process tool or other source of fluid and may be arranged to monitor an environmental location, e.g., to detect the incursion into such location of a contaminant or other fluid species of interest.

The features, advantages and arrangements of the fluid monitoring apparatus of the invention will be more fully apparent from the following description of specific illustrative embodiments of the invention, as shown in FIGS. 1-8.

FIG. 1 is a perspective exploded view of a fluid monitoring apparatus 10 according to one embodiment of the invention.

The fluid monitoring apparatus 10 includes circuitry compartment 12, which is of elongate cylindrical character, with a cylindrical circumscribing side wall 18 closed at a first (proximal) end by end wall 14 and open at a second (distal) end 16. The side wall 18 at its distal end portion has openings therein for engagement with screw fasteners 20 and 22, which are utilized to secure the circuitry compartment 12 to the base of the filament assembly 32. An on-off pressure-sensitive switch 24 is secured in position in the circuitry compartment 12 with a screw fastener 26.

The circuitry compartment 12 is a size and shape to accommodate therein a circuitry assembly 30 including a printed circuit board and an array of light emitting diodes. The printed circuit board is shaped with distal marginal extensions that engage receiving slots in the base of the filament assembly 32. Removably engageable with the filament assembly 32 is a filament guard 34, which overlies and protects the filaments in the filament assembly. The filament guard 34 in turn is overlaid by the distal cap 36.

Figure 2:
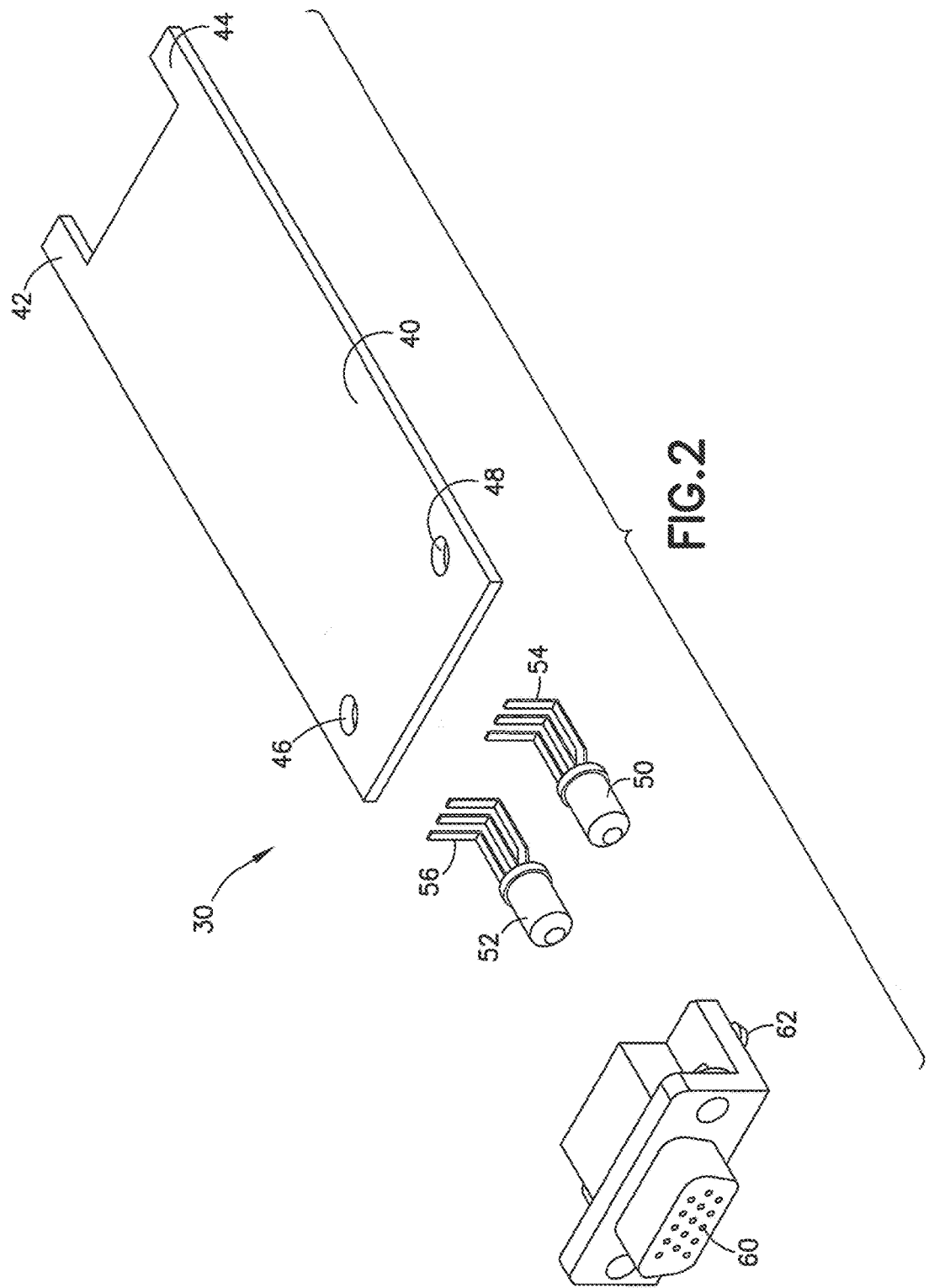
FIG. 2 is a perspective exploded view of a circuitry assembly including a printed circuit board and an array of light emitting diodes, as employed in the fluid monitoring apparatus of FIG. 1.

FIG. 2 is a perspective exploded view of a circuitry assembly 30 including a printed circuit board 40 and an array of light emitting diodes 50 and 52, as employed in the fluid monitoring apparatus of FIG. 1. The printed circuit board 40 is shaped with distal marginal extensions 42 and 44 that engage receiving slots in the base of the filament assembly 32 (see FIG. 1). The printed circuit board 40 is provided with holes 46 and 48 in the proximal marginal portions thereof to accommodate mechanical fasteners for securing the connector 60 to the board. One of such mechanical fasteners 62 is shown in the perspective view of FIG. 2 (the other being hidden in such view). The connector 60 is flanged, as shown, to provide a mounting surface accommodating the mechanical fasteners. The connector can be of any suitable type, e.g., a D-sub 15 pin connector in a specific embodiment of the invention. The connector thereby is coupled in use to a suitable source of power via a power cable provided with a plug having pins matably engageable with the connector.

The LEDs 50 and 52 are provided with connector leads 54 and 56, respectively, by which the LEDs are electrically coupled to the printed circuit board, mating with connector elements on the bottom face of the board in the view shown in FIG. 2.

Figure 3:
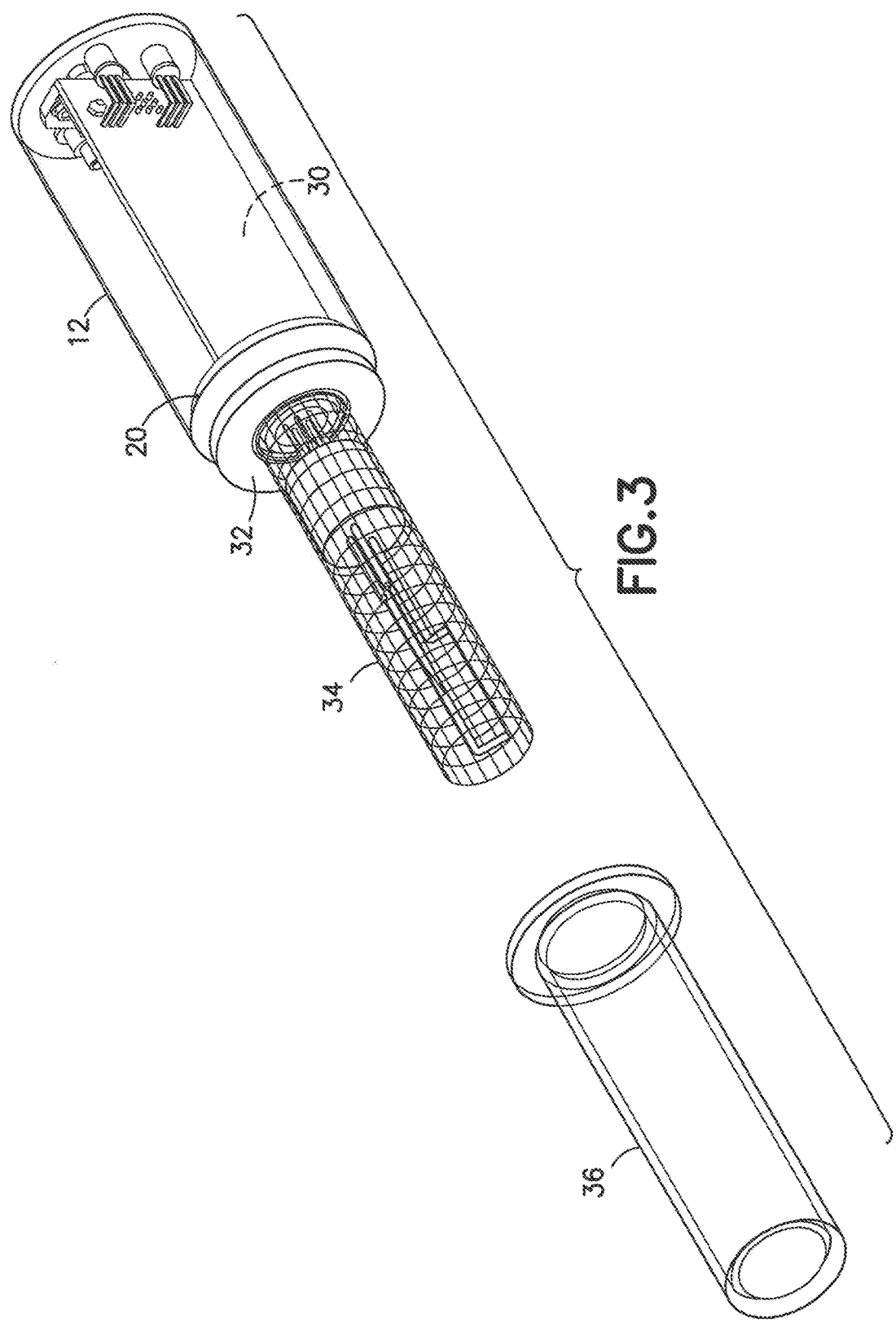
FIG. 3 is a perspective view of the fluid monitoring apparatus of FIG. 1, with the distal cap removed.

FIG. 3 is a perspective view of the fluid monitoring apparatus of FIG. 1, with the distal cap 36 removed, to show the filament guard 34 protectively overlying the filament assembly. The filament guard 34 is coupled to a collar 74 (see FIG. 5) of the distal cylindrical flange member 92 (see FIG. 6) in the base of the filament assembly, as described more fully hereinafter. The filament assembly 32 in turn is secured to circuitry compartment 12 by set screw 20. The circuitry compartment 12 contains the circuitry assembly 30 therein.

Figure 4:
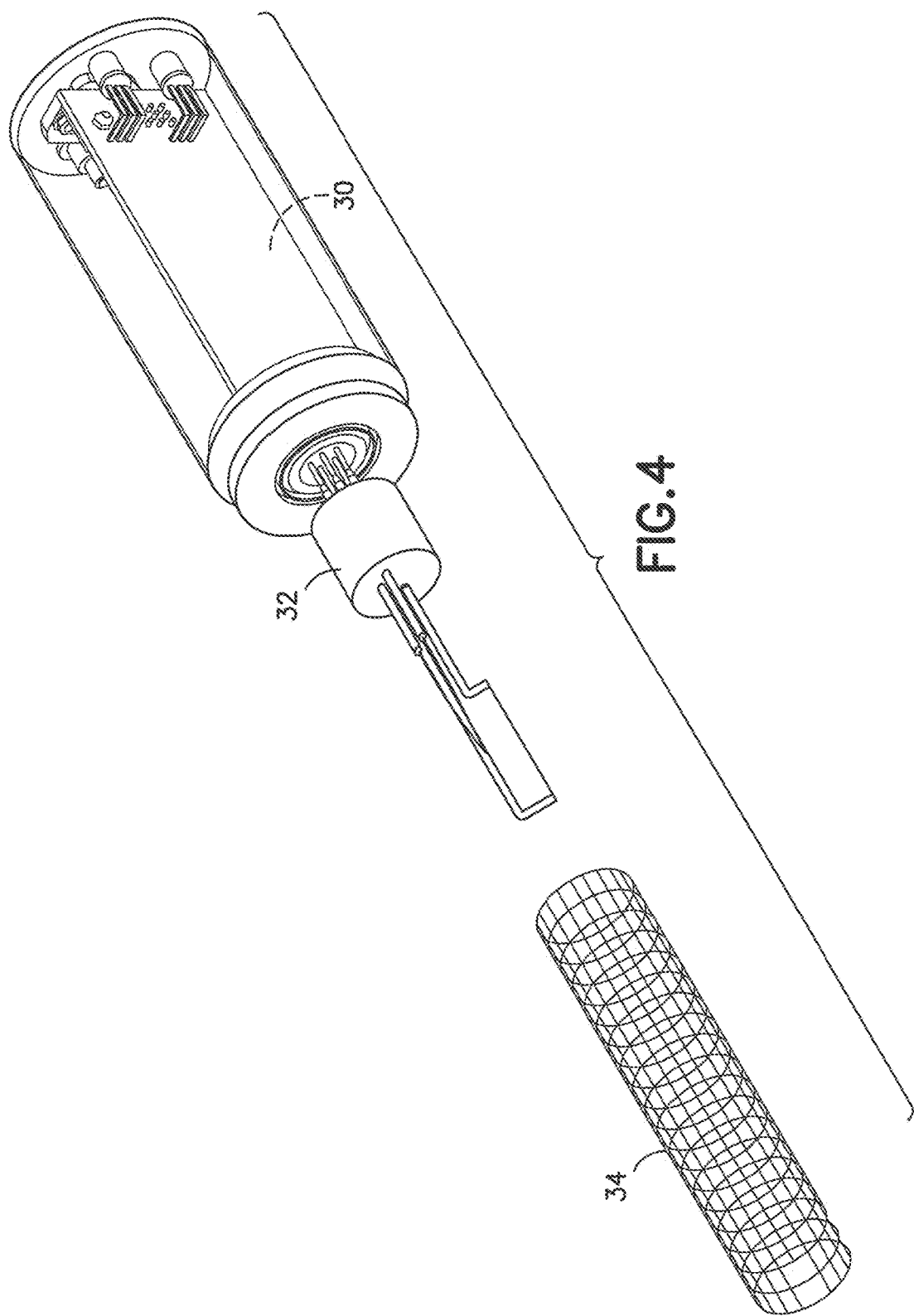
FIG. 4 is a perspective view of the fluid monitoring apparatus of FIG. 3, with the filament guard assembly removed.

FIG. 4 is a perspective view of the fluid monitoring apparatus of FIG. 3, with the filament guard 34 removed from the filament assembly 32. The filament assembly 32 is coupled to the circuitry compartment containing circuitry assembly 30, as previously described.

Figure 5:
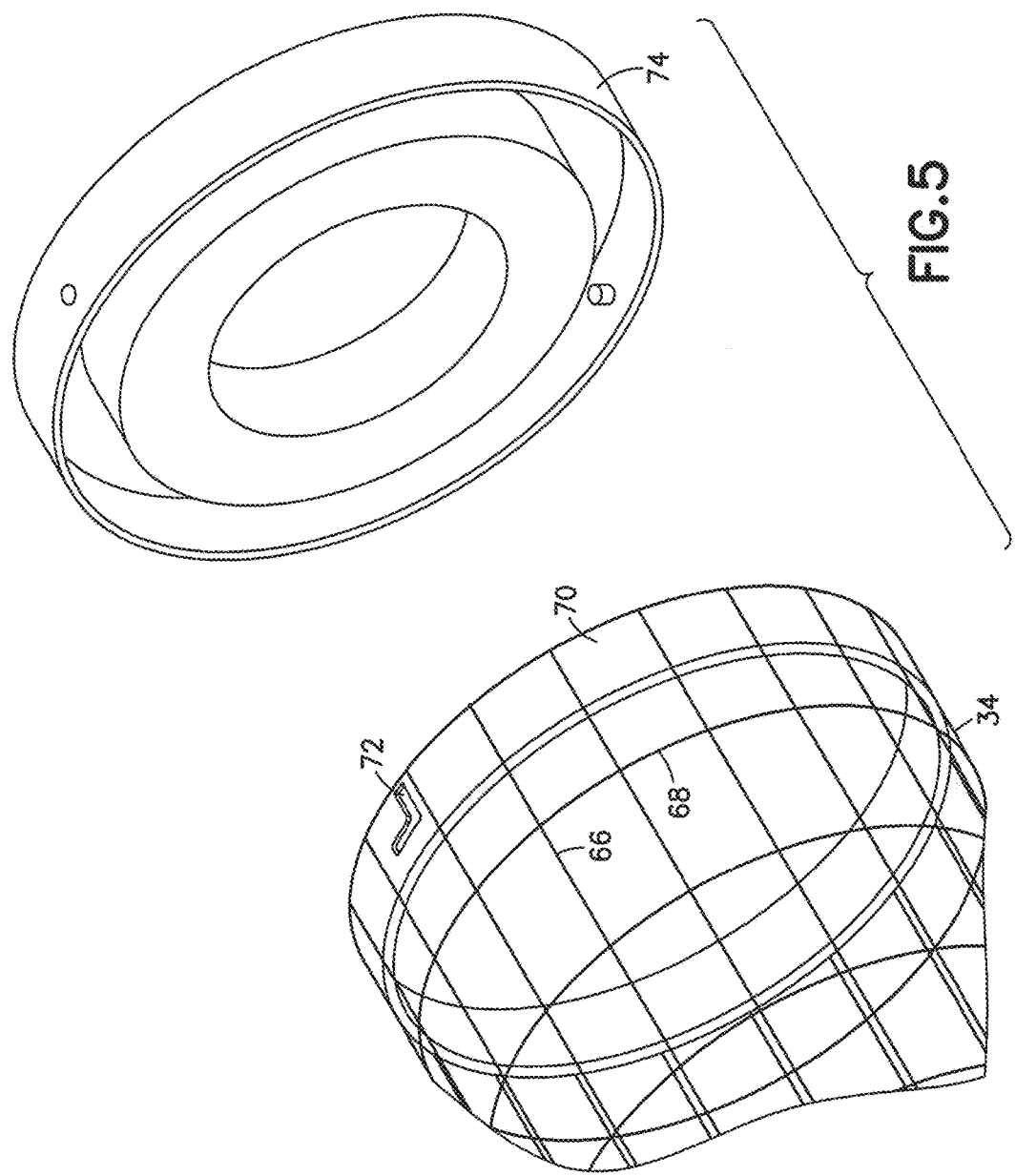
FIG. 5 is a perspective view of the filament guard assembly and the collar member with which it is removably engageable.

FIG. 5 is a perspective view of the filament guard 34 and the collar member 74 with which it is removably engageable. The filament guard 34 is constructed as a screen or mesh structure including an array of longitudinally spaced-apart, circumferentially extending strands 68 secured to an array of circumferentially spaced-apart, longitudinally extending strands 66. The respective circumferentially extending and longitudinally extending strands can be interwoven and/or spot-bonded, e.g, by brazing, welding, adhesive bonding or the like, at their crossover points, to form a unitary structure. The filament guard 34 includes a proximal ring 70 to which the longitudinal strands 66 are secured, e.g., by welding, brazing, adhesive bonding, etc.

The proximal ring 70 has an inverted "L" shaped slot 72 including a vertical entrance portion and a laterally extending portion. Such slot is releasably engageable by a protrusion element in the collar, so that the filament guard 34 is lockable in place by rearward translation of the filament guard 34 into the annular channel in the collar so that the collar protrusion moves along the vertical portion of the slot, following which the filament guard 34 can be manually circumferentially rotated in the direction of the transverse portion of the slot to lock the filament guard 34 in place.

Figure 6:
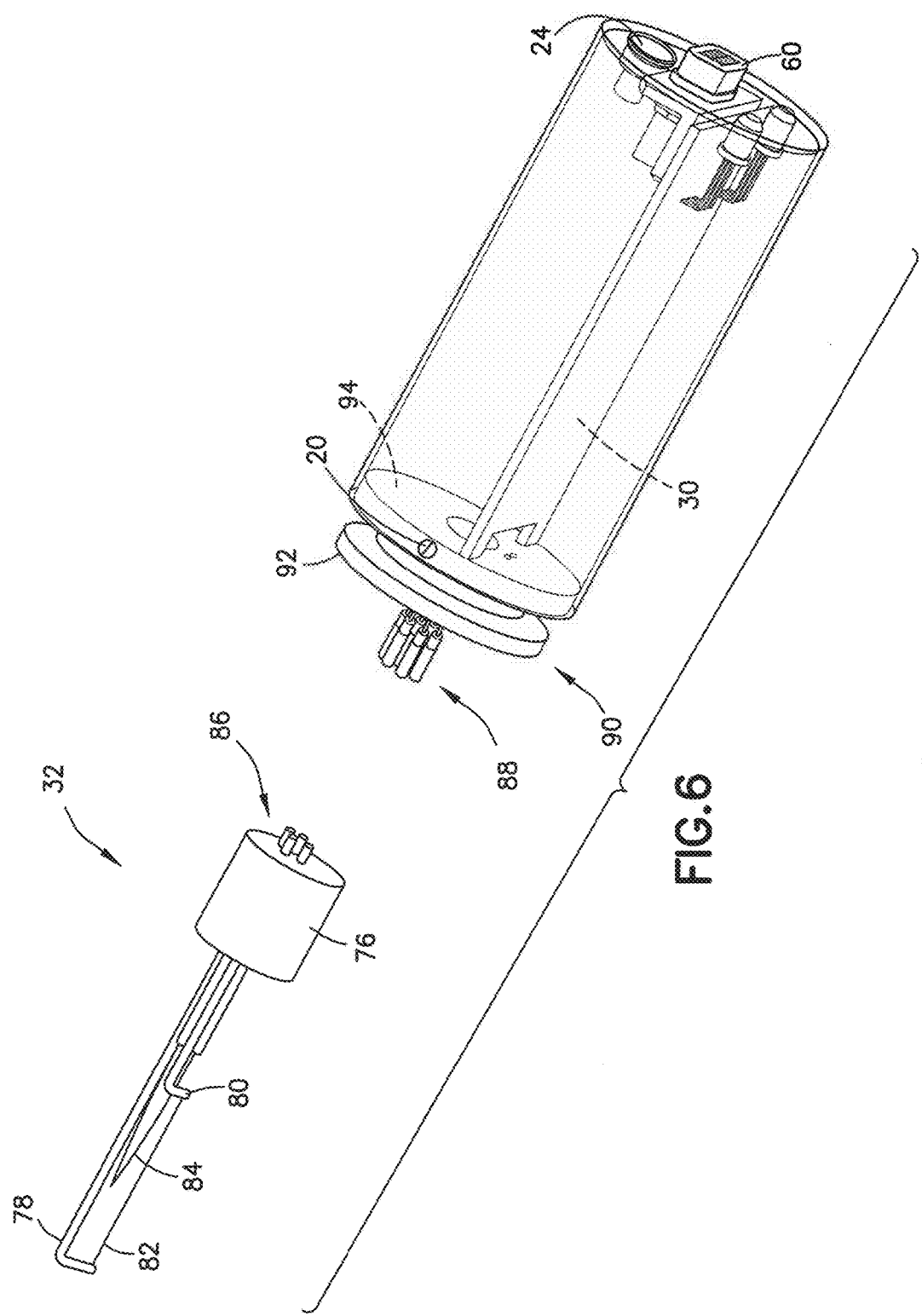
FIG. 6 is a perspective view of the fluid monitoring apparatus of FIG. 1, showing the press fit coupling structure of the filament assembly and the circuitry compartment.

FIG. 6 is a perspective view of the fluid monitoring apparatus of FIG. 1, showing the press-fit coupling structure of the filament assembly 32 and the circuitry compartment containing circuitry assembly 30 arranged so that the connector 60 protrudes through the proximal end wall, and with the on-off switch 24 arranged for access, to actuate or deactuate the switch button.

The filament assembly 32 as shown includes a core body 76 of cylindrical form in which filament mounting posts are mounted, with the mounting posts terminating in an array of male coupling elements 86 extending rearwardly of the core body proximal face. The circuitry compartment at its distal end portion engages the base 90 of the filament assembly. The base includes a proximal cylindrical flange member 94 that is received in the distal end opening of the circuitry compartment and secured in place by set screw 20, with the proximal cylindrical flange member 94 being in longitudinally spaced-apart relation to a distal cylindrical flange member 92. Distal cylindrical flange member 92 has an array of protruding female coupling elements 88 extending from its distal face, as shown, enabling press-fit connection of the respective male coupling elements 86 and female coupling elements 88.

The filament mounting posts extending distally from the core body 76 include posts 78 and 80, each of which is bent at its distal end, as shown, to provide a lateral extremity for securing a sensing filament 82 between them as illustrated.

In exposure to a specific fluid species for which the sensing filament 82 material of construction is selected, e.g., halogen, the sensing filament 82 interacts and changes resistance. Such resistance change then is transmitted as a signal from the sensing filament through the post structures to the printed circuit board for outputting of a signal correlative of such change, e.g., to signal the end point of a cleaning operation from which effluent is being passed in contact with the sensing filament 82. The output signal may be passed to the LEDs in the circuitry compartment, to energize one of the LEDs of a predetermined color, e.g., red, to designate the end point event, with the other one of the LEDs being otherwise illuminated in another predetermined color, e.g., green, to indicate that the end point event has not yet occurred. The output signal may also, or alternatively, be passed via the connector 60 and an associated power and output cable to a central processing unit and associated controller, e.g., an actuated valve that is controlled to shut off feeding of cleaning reagent(s) to an upstream process tool producing the effluent that is being monitored by the fluid monitoring apparatus.

Mounted on another pair of mounting posts extending distally from the core body 76 is a wishbone-shaped filament 84 constituting a thermocouple assembly, of which the separate legs converge to a juncture at a distal extremity.

In use, the sensing filament and wishbone assembly contact fluid, e.g., the effluent gas from a process chamber cleaning operation, and the sensing filament 82 changes resistance as a result of interaction with component(s) in the fluid, e.g., halogen components in a cleaning effluent stream. The wishbone filament 84 changes electrical resistance properties and is effective for adjusting and compensating for different thermal conditions that may otherwise affect the sensing filament 82.

Figure 7:
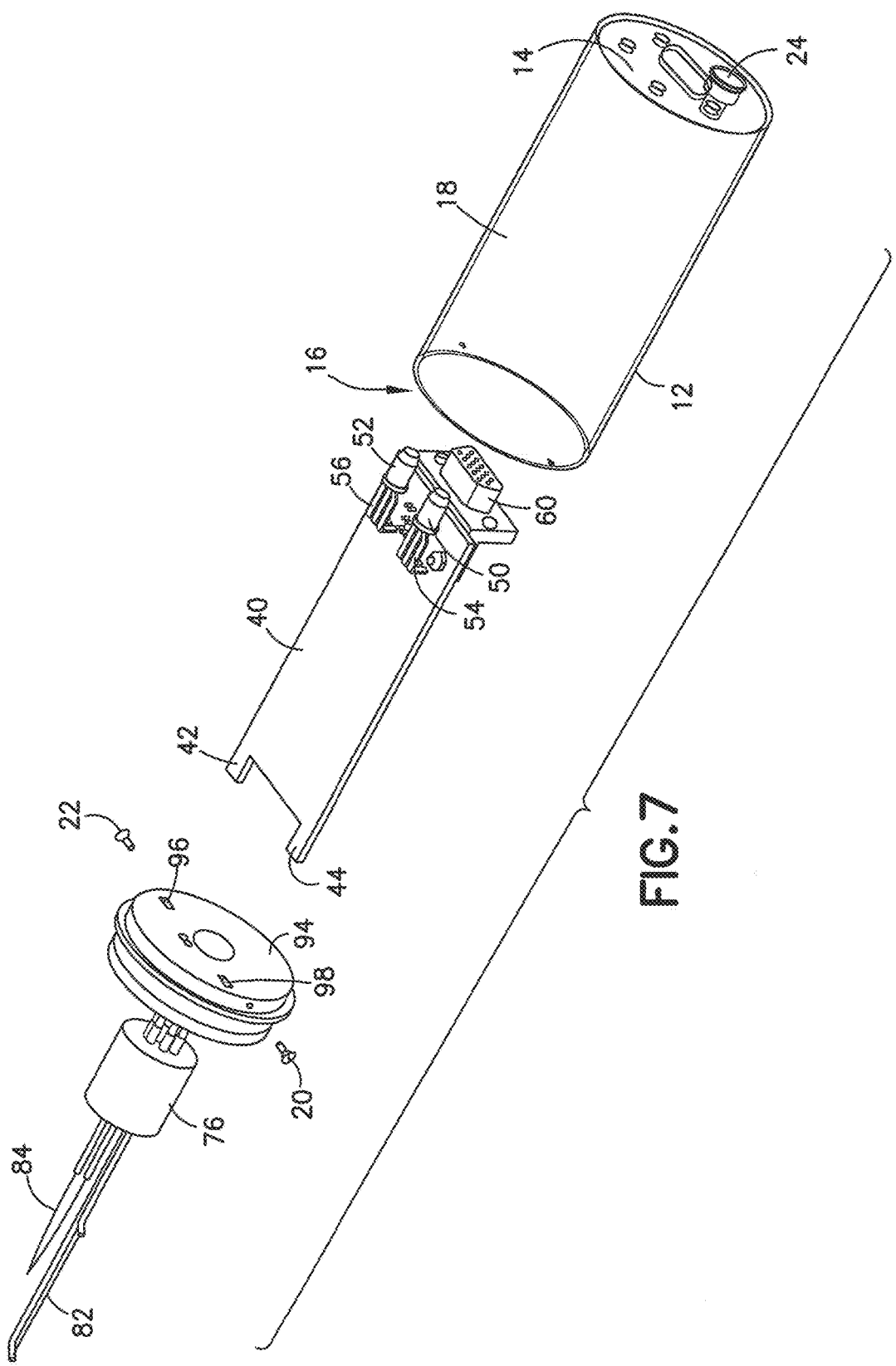
FIG. 7 is a perspective exploded view of the fluid monitoring apparatus of FIG. 1, showing the details of construction thereof.

FIG. 7 is a perspective exploded view of the fluid monitoring apparatus of FIG. 1, showing further details of construction thereof.

The circuitry compartment 12 is arranged to receive the circuitry assembly including printed circuit board 40 and array of light emitting diodes 50 and 52. The printed circuit board distal marginal extensions 42 and 44 engage the receiving slots 96 and 98 in the proximal cylindrical flange member 94 of the base of the filament assembly. The circuitry compartment includes openings in the proximal end wall 14 for the LEDs and screws for fastening the connector 60 in position, together with set screws 20 and 22 securing the proximal cylindrical flange member 94 of the base to the circuitry compartment 12.

Figure 8:
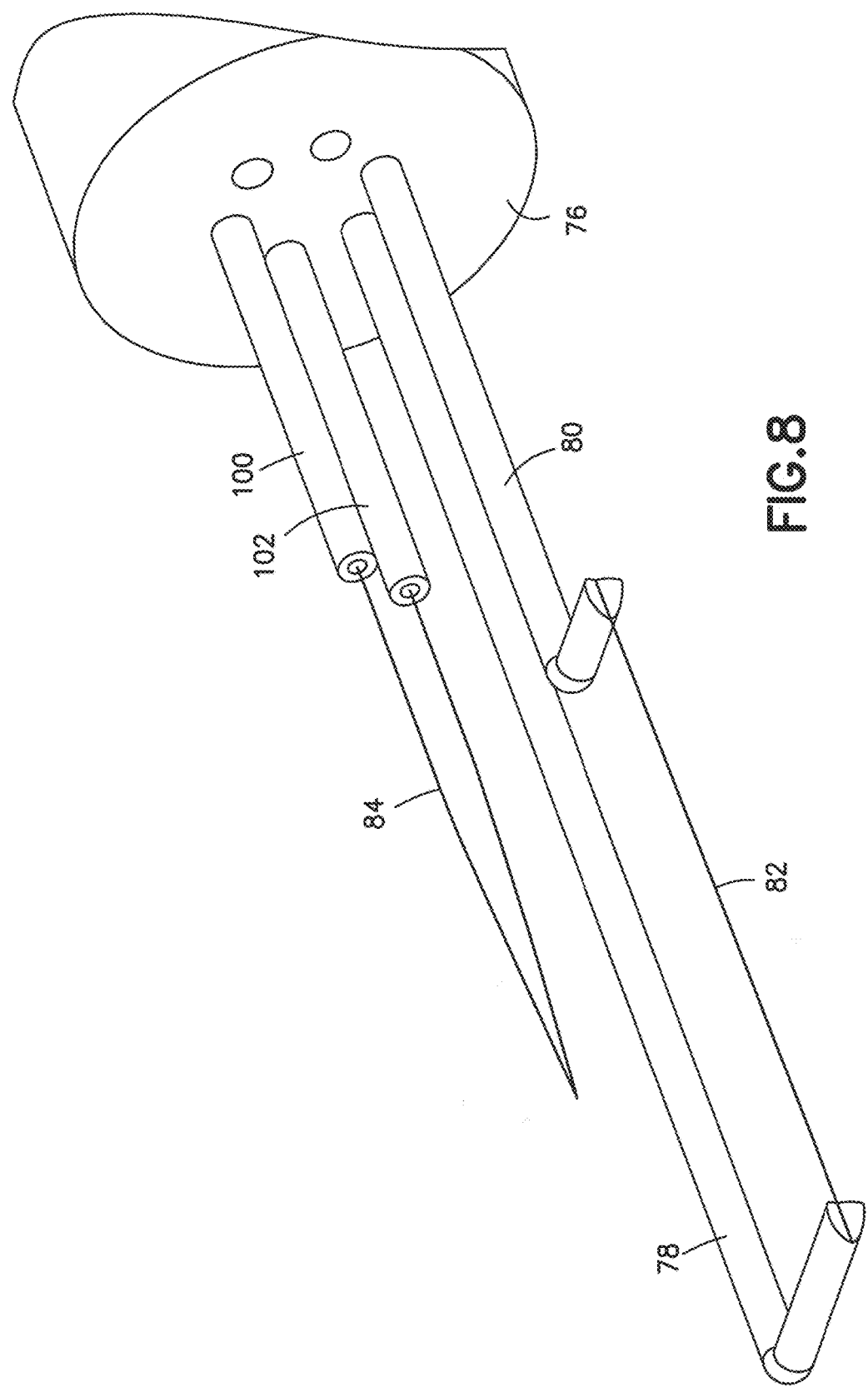
FIG. 8 is a perspective view in close up of the sensing components of the monitoring apparatus of FIG. 1.

FIG. 8 is a perspective view in close up of the sensing components of the monitoring apparatus of FIG. 1.

As depicted, the filament mounting posts 78 and 80 extend distally from the core body 76 respective bent ends to provide a lateral extremity for securing a sensing filament 82 between them. The posts 78 and 80 are fixtured in the core body, and the filament 82 may extend interiorly in a bore opening in each of the posts to the male coupling elements 86, or the posts themselves may be of a conductive material, with the core body being of an insulative material to accommodate signal transmission from the sensing filament 82.

The wishbone-shaped filament 84 is mounted on mounting posts 100 and 102 extending distally from the core body 76 and constituting the thermocouple assembly, of which the separate legs are joined at a distal extremity, as shown.

While the invention has been illustratively described with respect to the embodiment of FIGS. 1-8, in which the filament assembly includes a sensing filament and a compensatory thermocouple, it will be appreciated that the invention is not thus limited, but rather extends to and encompasses other arrangements with varying sensor elements. For example, the sensing filament may be provided as multiple filaments each having a selectivity for a specific component or components of the fluid being monitored by the fluid monitoring apparatus, together with one or more reference filaments for calibration or compensation of the sensing signal(s) generated in operation of the fluid monitoring apparatus.

It will be appreciated that the fluid monitoring apparatus of the invention affords a simple design with a small number of component parts. The filaments of the monitoring apparatus are readily protected in use, e.g., from collision with particulates that may be present in the fluid being monitored, by the filament guard protectively overlying the filament assembly. The filament guard may thus be retained over the filament assembly in use, or it may be utilized solely as a protective structure until the filament assembly is installed. In either application, the filament guard is readily removable from the base structure of the filament assembly for maintenance, repair or change-out of the sensing filaments, by a simple twist and lock/unlock manipulation.

The circuitry compartment contains the circuitry assembly in a readily removable condition, with the printed circuit board being axially slidable in the distal direction after removal of the filament assembly base from the circuitry compartment, whereby the printed circuit board can be easily serviced or replaced, thereby simplifying the maintenance and repair of the fluid monitoring assembly. Such simplification is further implemented by the modular filament assembly, in which the distal portion of the filament assembly including the core body can be press fit together for assembly, or longitudinally pulled apart to disconnect the distal portion from the base of the filament assembly, as shown in the view of FIG. 6. The distal portion of the filament assembly can thereby be changed out for a fresh distal portion in a quick and convenient manner, allowing ready field replacement of the filament elements of the monitoring apparatus. The filaments themselves can be spot welded on the appropriate posts, in specific embodiments of the invention.

The illustrative 15 pin connector of the illustrative embodiment allows substantial input/output capability. The bi-color LEDs enable a quick and reliable visual determination of the status of the monitoring operation and the occurrence of the endpoint event. The LEDs and connector are self-aligning in the circuitry compartment. The single printed circuit board represents a simple design, as does the four screw design of the illustrative fluid monitoring apparatus, thereby enabling ready assembly and disassembly of the fluid monitoring apparatus.

The endpoint monitor apparatus of the invention can be arranged for fluid contacting with the fluid to be monitored, in any suitable manner. The endpoint monitor apparatus can for example be arranged with the filament assembly disposed in a passage through which fluid, e.g., effluent from a process tool cleaning operation, is flowed, and with the circuitry compartment exteriorly extending from such passage. For this purpose, the base of the filament assembly may mate with a port in the fluid passage, being engaged therewith in a leak-tight manner, such as by use of gasket and/or other seal structure or elements. An outer surface of the base may be threaded in another embodiment, to engage a threaded opening in a fluid passage or other source structure for the fluid to be monitored. The filament guard as indicated may be retained in place overlying the filament array of the filament assembly during fluid monitoring operation, or the filament guard may be removed immediately prior to installation for fluid monitoring duty.

Although the sensing filament embodiments described herein utilize a change in resistance to monitor the fluid species of interest in the fluid being monitored, it will be appreciated that any other monitoring modality applicable to sensing elements may be employed in the broad practice of the invention. For example, the sensing element may include a non-filament sensing element that interacts with one or more fluid species of interest to generate a response signal or output for detection of the species of interest, such as a surface acoustic wave monitoring device, a colorimetric detector device, or a reversibly reactive sensing element whose reaction product causes the sensing element to have a different characteristic indicative of presence or a critical concentration regime of the species of interest.

The fluid monitoring apparatus of the invention can be utilized as an environmental monitoring device for detection of fluid species of interest in an environmental locus, e.g., to ensure that contaminant species in such locus do not exceed a threshold limit value (TLV) or other critical concentration, or it may be utilized for process monitoring of a fluid volume or fluid stream in a process system, such as a semiconductor manufacturing system, or the fluid monitoring apparatus may be employed on-board a fluid storage vessel containing toxic or otherwise hazardous gas, as a leak detector. As a further specific embodiment, the fluid monitoring apparatus may be employed in a hydrogen-powered vehicle, for monitoring of a hydrogen storage chamber in the vehicle, to detect any leakage that may pose a danger to the vehicle and/or its occupants.

In place of the printed circuit board illustratively described herein in the embodiment of FIGS. 1-8, the fluid monitoring apparatus of the invention may employ integrated circuitry chipsets, microprocessors, programmable logic controllers, fluidic logic circuits, or any other circuitry or micro- or nano-electronic devices enabling the sensing by the fluid sensing element(s) of the apparatus to be transmitted or processed for outputting of a useful signal, e.g., to actuate an alarm, control an upstream process generating the fluid being monitored, provide emergency shut-down of a fluid-using or fluid-generating installation, etc.

While the invention has been has been described herein in reference to specific aspects, features and illustrative embodiments of the invention, it will be appreciated that the utility of the invention is not thus limited, but rather extends to and encompasses numerous other variations, modifications and alternative embodiments, as will suggest themselves to those of ordinary skill in the field of the present invention, based on the disclosure herein. Correspondingly, the invention as hereinafter claimed is intended to be broadly construed and interpreted, as including all such variations, modifications and alternative embodiments, within its spirit and scope.

What is claimed is:

1. A fluid monitoring apparatus, comprising:
   a circuitry housing adapted for retention therein of circuitry configured for processing fluid sensing signals and responsively transmitting an output; and
   a sensor assembly adapted for mechanical coupling to the circuitry housing, including at least one sensing member arranged to contact fluid and respond to presence of a fluid species of interest in the contacted fluid by change of a characteristic of the at least one sensing member that is inputtable to circuitry in the circuitry housing, to generate an output;
   the sensor assembly including a base and the at least one sensing member removably connected to the base by press-fit coupling elements;
   wherein the circuitry housing is of elongate cylindrical shape with a proximal end wall containing one or more openings therein for self-aligning registration of the circuitry therewith, the circuitry further comprising a light emitting diode (LED) engaging at least one of the one or more openings in the proximal end wall.

2. The fluid monitoring apparatus of claim 1, wherein the at least one sensing member comprises a sensing filament connected to the base, and wherein the apparatus comprises a filament guard removably coupleable to the base to protectively circumscribe the sensing filament.

3. The fluid monitoring apparatus of claim 1, wherein the circuitry comprises a printed circuit board and a connector engaging at least one of said one or more openings in the proximal end wall.

4. The fluid monitoring apparatus of claim 1, wherein the circuitry comprises a printed circuit board including at least one extension portion engaging the base.

5. The fluid monitoring apparatus of claim 1, wherein the sensing member comprises a sensing filament.

6. The fluid monitoring apparatus of claim 5, wherein the apparatus comprises a filament guard removably coupleable to the base to protectively circumscribe the sensing filament, wherein the filament guard is of cylindrical form, and comprises an array of circumferentially extending first strand elements and an array of longitudinally extending second strand elements, and wherein the first strand elements and second strand elements are interconnected.

7. The fluid monitoring apparatus of claim 6, wherein the filament guard comprises a proximal ring having an inverted L-shaped slot therein, wherein the base includes a locking protrusion member, and wherein the filament guard is removably coupled to the base by engagement of the locking protrusion member in a laterally extending portion of the inverted L-shaped slot.

8. The fluid monitoring apparatus of claim 1, wherein the sensor assembly includes a first sensing member comprising a sensing filament, and a second sensing member comprising a thermocouple.

9. The fluid monitoring apparatus of claim 8, wherein the thermocouple is arranged to compensate the first sensing member for changes of fluid monitoring temperature condition.

10. The fluid monitoring apparatus of claim 9, wherein the thermocouple has a wishbone conformation.

11. The fluid monitoring apparatus of claim 1, as arranged to monitor fluid from a semiconductor manufacturing process tool.

12. The fluid monitoring apparatus of claim 1, wherein the apparatus comprises a at least one sensing member guard removably coupled to the base to protect the sensing member.

13. The fluid monitoring apparatus of claim 12, wherein the sensing member guard comprises a screen or mesh structure.

14. The fluid monitoring apparatus of claim 1, wherein the circuitry comprises integrated circuitry.

15. The fluid monitoring apparatus of claim 1, wherein the circuitry comprises a microprocessor or a programmable logic controller.

16. The fluid monitoring apparatus of claim 1, wherein the circuitry is configured to output an alarm signal or a control signal in response to fluid sensing by the at least one sensing member.

17. The fluid monitoring apparatus of claim 16, wherein the circuitry is configured to output the control signal for control of a process generating the fluid being monitored.

18. The fluid monitoring apparatus of claim 16, wherein the circuitry is configured to output the control signal to shut down an installation using or generating the fluid being monitored by the at least one sensing member.

* * * * *